(12) United States Patent
Cailleaux

(10) Patent No.: US 10,865,031 B2
(45) Date of Patent: Dec. 15, 2020

(54) MOISTURE CONTROL PACKAGING MATERIALS

(71) Applicant: PHILIP MORRIS PRODUCT S.A., Neuchatel (CH)

(72) Inventor: Timothee Cailleaux, Divonne-les-Bains (FR)

(73) Assignee: Philip Morris Products S.A., Neuchatel (CH)

( * ) Notice: Subject to any disclaimer, the term of this patent is extended or adjusted under 35 U.S.C. 154(b) by 76 days.

(21) Appl. No.: 15/761,321

(22) PCT Filed: Sep. 21, 2016

(86) PCT No.: PCT/IB2016/055637
§ 371 (c)(1),
(2) Date: Mar. 19, 2018

(87) PCT Pub. No.: WO2017/055970
PCT Pub. Date: Apr. 6, 2017

(65) Prior Publication Data
US 2018/0265273 A1    Sep. 20, 2018

(30) Foreign Application Priority Data

Sep. 29, 2015 (EP) .................................... 15187298

(51) Int. Cl.
*B65D 85/10* (2006.01)
*B65D 81/22* (2006.01)
(Continued)

(52) U.S. Cl.
CPC ............... *B65D 81/22* (2013.01); *B32B 7/12* (2013.01); *B32B 15/08* (2013.01); *B32B 15/085* (2013.01);
(Continued)

(58) Field of Classification Search
CPC .... B65D 81/22; B65D 81/264; B65D 81/266; B65D 81/268; B65D 85/1045; A24F 25/00
(Continued)

(56) References Cited

U.S. PATENT DOCUMENTS 2,329,908 A  *  9/1943  Johnson ................. A24F 25/02
                                                              312/31
4,100,324 A      7/1978  Anderson et al.
(Continued)

FOREIGN PATENT DOCUMENTS

CN         203529090 U     4/2014
CN         103981773 A     8/2014
(Continued)

OTHER PUBLICATIONS

International Search Report and Written Opinion issued for PCT/IB2016/055637, dated Dec. 5, 2015, by the European Patent Office; 16 pgs.
(Continued)

*Primary Examiner* — Luan K Bui
(74) *Attorney, Agent, or Firm* — Mueting Raasch Group

(57) ABSTRACT

Packaging materials are configured such that when sealed to define an interior volume of a package the packaging material has an inner surface facing the interior volume and an outer surface facing away from the interior volume. Between the inner surface and the outer surface, the packagings contain moisture controlling material. The permeability of moisture from the outer surface to the moisture controlling material is less than the permeability of moisture from the inner surface to the moisture controlling material to provide selective moisture transfer between the moisture controlling material and the interior volume of a sealed package formed, at least in part, from the packaging mate-
(Continued)

rial. The nature of the packaging material and the moisture controlling material can be tuned to control the relative humidity within the sealed inner volume.

15 Claims, 5 Drawing Sheets

(51) Int. Cl.
| | |
|---|---|
| *B32B 7/12* | (2006.01) |
| *B32B 15/14* | (2006.01) |
| *B32B 15/20* | (2006.01) |
| *B32B 27/12* | (2006.01) |
| *B32B 27/28* | (2006.01) |
| *B32B 27/30* | (2006.01) |
| *B32B 27/32* | (2006.01) |
| *B32B 27/36* | (2006.01) |
| *B32B 27/08* | (2006.01) |
| *B32B 15/08* | (2006.01) |
| *B32B 15/085* | (2006.01) |
| *B32B 15/088* | (2006.01) |
| *B32B 15/09* | (2006.01) |
| *A24F 25/00* | (2006.01) |

(52) U.S. Cl.
CPC ............ *B32B 15/088* (2013.01); *B32B 15/09* (2013.01); *B32B 15/14* (2013.01); *B32B 15/20* (2013.01); *B32B 27/08* (2013.01); *B32B 27/12* (2013.01); *B32B 27/285* (2013.01); *B32B 27/304* (2013.01); *B32B 27/32* (2013.01); *B32B 27/322* (2013.01); *B32B 27/36* (2013.01); *B65D 85/1045* (2013.01); *A24F 25/00* (2013.01); *B32B 2255/20* (2013.01); *B32B 2255/205* (2013.01); *B32B 2260/00* (2013.01); *B32B 2260/021* (2013.01); *B32B 2260/04* (2013.01); *B32B 2262/02* (2013.01); *B32B 2262/06* (2013.01); *B32B 2262/08* (2013.01); *B32B 2307/724* (2013.01); *B32B 2307/726* (2013.01); *B32B 2307/7246* (2013.01); *B32B 2307/7265* (2013.01); *B32B 2439/40* (2013.01); *B32B 2439/62* (2013.01); *B32B 2439/70* (2013.01); *B32B 2553/00* (2013.01)

(58) Field of Classification Search
USPC .... 206/204, 245, 265, 268, 271, 273, 524.2, 206/524.3
See application file for complete search history.

(56) References Cited

U.S. PATENT DOCUMENTS

| | | | |
|---|---|---|---|
| 4,934,524 A | 6/1990 | St. Charles | |
| 5,035,731 A * | 7/1991 | Spruill | A24F 25/02 206/7 |
| 6,929,120 B2 * | 8/2005 | Zonker | B65D 7/04 206/205 |
| 8,048,516 B2 | 11/2011 | Tee et al. | |
| 2007/0261704 A1 | 11/2007 | Tanbo et al. | |
| 2010/0252462 A1* | 10/2010 | Marchetti | B65D 5/606 206/268 |
| 2014/0287174 A1* | 9/2014 | Klein | C08L 23/12 428/35.7 |
| 2015/0021219 A1* | 1/2015 | Seyfferth De Oliveira | B65D 85/1045 206/268 |
| 2015/0201673 A1 | 7/2015 | Houmani | |
| 2015/0218315 A1 | 8/2015 | Takeo et al. | |
| 2016/0030918 A1 | 2/2016 | Kaimoto et al. | |
| 2016/0207688 A1* | 7/2016 | Sebastian | B05D 1/007 |

FOREIGN PATENT DOCUMENTS

| | | |
|---|---|---|
| CN | 104207328 A | 12/2014 |
| DE | 4000143 A1 | 7/1991 |
| EP | 0 348 840 A2 | 1/1990 |
| EP | 1 813 553 A1 | 8/2007 |
| EP | 2 886 582 A1 | 6/2015 |
| GB | 136992 A | 12/1919 |
| JP | 2005-272009 A | 10/2005 |
| JP | 2010120385 A | 6/2010 |
| JP | 2014237121 A | 12/2014 |
| WO | WO 2004/000541 A1 | 12/2003 |
| WO | WO 2008148701 A1 | 12/2008 |
| WO | WO 2009/106493 A1 | 9/2009 |
| WO | WO 2010/025108 A1 | 3/2010 |
| WO | WO 2010/119140 A1 | 10/2010 |
| WO | WO 2013/120915 A1 | 8/2013 |
| WO | WO 2014/113556 A1 | 7/2014 |
| WO | WO 2015/102614 A1 | 7/2015 |

OTHER PUBLICATIONS

Extend European Search Report issued for EP 15187298.3, dated Jan. 4, 2016, by the European Patent Office; 9 pgs.
O'Brien, "The Control of Humidity by Saturated Salt Solutions," *J Sci Instruments*, Mar. 1948;25(3):73-76.
Written Opinion and Search Report issued by the Singapore Patent Office for SG Application No. 11201801771Q; dated May 4, 2019: 12 pgs.
Chinese Office Action dated Aug. 6, 2019, issued by the China National Intellectual Property Administration for CN Application No. 201680050774.2, including English Translation; 12 pgs.
Japanese Office Action for JP Patent Application 2018-514317 issued by the Japanese Patent Office dated Aug. 17, 2020; 2 pgs.

\* cited by examiner

MOISTURE CONTROL PACKAGING MATERIALS

This application is the § 371 U.S. National Stage of International Application No. PCT/IB2016/055637, filed 21 Sep. 2016, which claims the benefit of European Application No. 15187298.3, filed 29 Sep. 2015.

This disclosure relates to flexible packaging material that sorbs or releases moisture. The flexible packaging material can be used to control relative humidity of an interior volume defined by the flexible packaging material when sealed to form a package.

A number of consumer goods retain freshness or perception of freshness when stored in environments that maintain a desired relative humidity. Some solutions have been proposed to maintain relative humidity in a sealed package. For example, desiccants have been placed within sealed packages or have been incorporated into inner layers of packaging to maintain a dry interior environment. To maintain moist environments, humectants have been placed in the sealed package. For example, humidity pads have been sealed within packages to maintain moist environments within the sealed package.

Food products and smoking articles are examples of consumer products for which storage in a humidity controlled environment may be desirable. Smoking articles such as cigarettes and cigars are commonly packaged in rigid hinge-lid containers having a box and a lid connected to the box about a hinge line extending across the rear wall of the container. Such hinge-lid containers are typically constructed from one-piece laminar cardboard blanks. In use, the lid is pivoted about the hinge line to open the container and so gain access to a bundle of smoking articles disposed within the box.

The bundle of smoking articles disposed within the box is typically wrapped in an inner liner of metallized paper, metal foil, or other flexible sheet material. To access the bundle of smoking articles within the inner liner, a consumer typically removes and discards a pre-perforated upper portion of the inner liner upon first opening the hinge-lid container.

To provide improved protection against the ingress and egress of, for example, air, moisture, flavors and odors, it is also known to enclose the bundle of smoking articles in a resealable substantially airtight wrapper. Despite the wrappers being resealable, the relative humidity in the interior volume of the wrapper can change during a period of time in which the wrapper is opened.

To maintain high relative humidity within the airtight wrapper, humidity pads or other moisture releasing elements have been proposed to be placed within the airtight wrapper. However, adding an extra component to the packaging results complicates manufacturing, which can be particularly problematic with high speed manufacturing lines as typically employed in the smoking article manufacturing industry.

One object of the present invention is to provide packaging material capable of releasing and sorbing moisture. Preferably, such packaging material can be used to control relative humidity of an interior volume defined by the packaging material when sealed to form a package.

Another object of the present invention is to provide containers for consumer goods having packaging material capable of releasing and sorbing moisture such that relative humidity in the container can be controlled. Preferably, the consumer goods are smoking articles.

Other objects of the present invention will be evident to those of skill in the art upon reading and understanding the present disclosure, which includes the claims that follow and accompanying drawings.

In various aspects of the present invention, a flexible packaging material comprises a moisture barrier layer and a moisture control layer comprising a moisture controlling material. The moisture control layer comprises a moisture controlling material. As used herein, a "moisture controlling material" is a material that can readily sorb moisture and readily release moisture under typical storage conditions, as the storage conditions vary. For example, under dry conditions, a moist moisture control material can readily release moisture. Under high humidity conditions, a dry moisture control material can readily sorb moisture. In preferred embodiments, the moisture controlling material has a vapor pressure that controls the humidity within an interior volume of a sealed package formed by the packaging. The moisture controlling material can sorb or desorb moisture in the interior volume through the moisture permeable layer until the partial pressure of water in the interior volume equals the vapor pressure of the moisture controlling material. In some preferred embodiments, the moisture control layer can be a moisture permeable layer and can form an inner surface of a package when the packaging material is sealed. In other preferred embodiments, the moisture control packaging material further comprises a moisture permeable layer, and the moisture control layer is positioned between the moisture barrier layer and the moisture permeable layer.

In some aspects of the present invention, a moisture control packaging material comprises an outer surface, and inner surface and a moisture controlling material disposed between the outer surface and the inner surface. The permeability of water from the inner surface to the moisture controlling material is greater than permeability of water from the outer surface to the moisture controlling material. The moisture controlling material is configured to maintain a relative humidity between 20% and 90%, preferably between 40% and 80% in an interior volume defined by the packaging when sealed. Preferably, the moisture permeable moisture control layer preferably comprises a moisture controlling material selected from the group consisting of a humidity regulating salt solution and a polyether polyamide.

In various aspects of the present invention, a moisture control packaging material comprises a moisture barrier layer and a moisture permeable moisture control layer. The moisture permeable moisture control layer preferably comprises a moisture controlling material selected from the group consisting of a humidity regulating salt solution and a polyether polyamide.

In preferred aspects of the present invention, a container comprises a housing comprising a box and a lid hingedly attached to the box. The container further comprises an inner package disposed within the housing and defines an interior volume for housing consumer goods. The inner package is formed at least partially from a moisture control packaging material of the present invention. Preferably, (i) the inner package defines an access opening through which consumer goods can be removed, and (ii) the inner package comprises a resealable flap. The access opening is covered by the flap when the flap is in a closed position. The access opening is at least partially uncovered when the flap is in an open position.

In preferred aspects of the present invention an assembly includes a container of the present invention and consumer goods stored in the container. Preferably, the consumer goods are smoking articles.

Various aspects of the packaging materials, containers, and assemblies of the present invention may have one or more advantages relative to currently available currently available, packaging materials, containers and assemblies that attempt to regulate humidity of a sealed interior volume. For example, packaging materials of the present invention can provide a large surface area through which a moisture controlling material can act. For example, by incorporating moisture controlling material in the packaging material that defines all or substantially all of the sealed inner surface of a package, the surface area over which the moisture controlling material can sorb moisture from and release moisture to sealed interior volume can be substantially greater that that achievable by sealing, for example, a humidity pad in the interior volume. In addition, integration of the moisture controlling material into the packaging material, as opposed to placing a moisture controlling material within an interior volume defined by the packaging material, can reduce manufacturing steps or changes in manufacturing lines. For example, packaging materials of the present invention can be substituted for currently employed packaging materials using existing manufacturing equipment and lines. For large scale manufacturing, particularly high-speed manufacturing as employed in the smoking article industry, the addition of manufacturing steps or changes to equipment can be difficult to implement. Additional advantages of one or more aspects of packaging materials, containers, and assemblies described herein will be evident to those of skill in the art upon reading and understanding the present disclosure.

Packaging materials of the present invention integrate into the packaging material a solution for controlling humidity to desorb or sorb moisture depending on local environmental conditions. When sealed to form packages defining an interior volume, the packaging materials can control relative humidity within the interior volume. Preferably, the packages are resealable so that the packages can be opened and readily resealed. When the package is opened to access one or more consumer goods stored in the interior volume, also called headspace, the relative humidity of the interior volume will begin to equilibrate with the external environment and may cause the relative humidity of the interior volume to deviate from a desired range. If the packaged is resealed, the moisture controlling material in the packaging material and the structure of the packaging can change relative humidity in the interior volume towards restoring a desired humidity level. This is particularly advantageous when one or more consumer goods remain in the package after opening and resealing.

Packaging materials of the present invention are configured such that when sealed to define an interior volume of a package the packaging material has an inner surface facing the interior volume and an outer surface facing away from the interior volume. Between the inner surface and the outer surface, the packaging materials of the present invention contain moisture controlling material. The permeability of moisture from the outer surface to the moisture controlling material is less than the permeability of moisture from the inner surface to the moisture controlling material to provide selective moisture transfer between the moisture controlling material and the interior volume of a sealed package formed, at least in part, from a packaging material of the present invention. Preferably, the permeability of moisture from the outer surface to the moisture controlling material is substantially less than the permeability of moisture from the inner surface to the moisture controlling material. For example, the permeability of moisture from the inner surface to the moisture controlling material may be 5 times or more, such as 10 times or more, or 50 times or more than the permeability of moisture from the outer surface to the moisture controlling material.

In preferred embodiments, packaging materials of the present disclosure comprise a moisture barrier layer, a moisture permeable layer, and moisture controlling material. The moisture controlling material can be disposed in or form at least a part of the moisture permeable layer. Preferably, the packagings comprise a moisture control layer disposed between the moisture barrier and the moisture permeable layer. The moisture control layer comprises the moisture controlling material. The moisture permeable layer forms the inner surface of the packaging.

For purposes of the present invention a moisture barrier layer is a layer that has a water vapor or moisture transmission rate (WVTR) of equal to or less than 20 grams/meter$^2$ per 24 hours at 38° C. and 90% relative humidity when determined by ISO 2528: 1995. Preferably, a moisture barrier layer of a packaging of the present invention has a WVTR of less than 10 grams/meter$^2$ per 24 hours at 38° C. and 90% relative humidity.

For purposes of the present invention, a moisture permeable layer is a layer that has a water vapor or moisture transmission rate (WVTR) of greater than 20, preferably of greater than 40, more preferably of greater than 60, even more preferably of greater than 80 and even more preferably of greater than 100 grams/meter$^2$ per 24 hours at 38° C. and 90% relative humidity when determined by ISO 2528: 1995. In some embodiments, a moisture permeable layer of a packaging of the present invention has a WVTR of greater than 500 grams/meter$^2$ per 24 hours at 38° C. and 90% relative humidity.

As used herein, flexible packaging material means materials, that can be, for example, crumpled, made into pouches, bags, bundles, skin packaging and into peelable lids.

A packaging material of the present invention can include any suitable moisture barrier layer. Suitable moisture barrier layers include aluminum foil, polyvinylidene chloride (PVDC), or polyolefins such as low density polyethylene (LDPE) or linear low density polyethylene (LLDPE). Moisture barrier layers can have any suitable thickness. The thickness of the moisture barrier layer can affect performance properties such as moisture barrier properties and delamination resistance.

Any suitable metal or metal oxide layer can be used as a barrier layer. Examples of suitable metal and metal oxide layers include foils and deposited metals, such as aluminum foil, aluminum oxide, silicon oxide, and metallized polyethylene terephthalate.

A bulk layer may be provided to provide additional functionality such as stiffness or heat sealability or to improve machinability, cost, flexibility, or barrier properties. Preferred bulk layers comprise one or more polyolefins such as polyethylene, ethylene-alpha olefin copolymers (EAO), polypropylene, polybutene, ethylene copolymers having a majority amount by weight of ethylene polymerized with a lesser amount of a comonomer such as vinyl acetate, and other polymeric resins falling in the "olefin" family classification. The bulk layer may be of any suitable thickness or may be omitted for use in certain applications, but is preferably present to improve especially stiffness or flexibility properties and heat sealability.

A packaging material of the present invention can include any suitable moisture permeable layer. Moisture permeability can be an inherent characteristic of the material forming the layer or the material can be made permeable by forming pores or channels in the layer. Preferably, the moisture barrier layer is permeable to moisture or water vapor but is not permeable to water. This can be accomplished by, for example, microscopic pores. Pores can be formed by, for example, extruding a polymer with $CO_2$, by foaming polymeric material prior to extrusion, coating or casting, or by introducing and removing a porogen. Non-limiting examples of porogens include salts, such as sodium bicarbonate, gelatin beads, sugar crystals, and polymeric microparticles. One or more porogen can be incorporated into a polymer prior to curing or setting. The polymer may then be cured or set, and the porogen may be extracted with an appropriate solvent. The size, degree and interconnectivity of the pores can be controlled by, for example, the size and concentration of porogen used or the extent of mixing with gas or foaming.

Preferably, the moisture permeable layer is heat sealable. A heat sealable layer is a layer capable of fusion bonding by conventional indirect heating means which generates sufficient heat on at least one film contact surface for conduction to a contiguous film contact surface and formation of a bond interface between the surfaces without loss of the film integrity. The bond interface between contiguous layers preferably has sufficient physical strength to withstand the packaging process and subsequent handling. Heat seals may be designed to meet different conditions of expected use and various heat seal formulations are known in the art and may be employed with the present invention. Preferably the article contact or heat seal layer is heat sealable to itself, but may be sealable to other objects, films or layers or to an outer layer in a lap seal.

Alternatively, a moisture permeable layer can be sealed by any other suitable mechanism, such as ultrasonic welding or an adhesive.

Examples of polymers that can form the moisture permeable layer include polytetrafluoroethylene, polybutylene terephthalate and polyethylene oxide.

Further examples of polymers that can form the moisture permeable layer include entrained polymers. Entrained polymers include a base polymer, an active agent, and a channeling agent. The active agent acts on, interacts or reacts with a selected material. The channeling agent is immiscible with the base polymer and is adapted to transmit a selected material through the entrained polymer at a faster rate than in solely the base polymer. The channeling agent is a water insoluble polymer.

Packaging materials of the present invention can comprise any suitable moisture controlling material that can readily sorb moisture and readily desorb moisture under typical storage conditions as the storage conditions vary. Preferably, the moisture controlling material has a vapor pressure that controls or establishes the relative humidity within and interior volume of a sealed package formed by a packaging material of the present invention. The moisture controlling material can sorb or desorb water vapor to the interior space until the partial pressure of water in the interior space equals the vapor pressure of the moisture controlling material.

A moisturized polymeric material can be the moisture controlling material. In addition or alternatively, a moisture controlling material can be incorporated into a polymeric material or a polymeric material can be charged with a moisture controlling material. Preferably, the moisture controlling material is present in a moisture control layer separate from the moisture permeable layer.

In some preferred embodiments, the moisture controlling material comprises a polyether polyamide. Suitable polyether amides include polyether polyamide in which a diamine constituent unit thereof is derived from a specified polyether diamine compound and a xylylenediamine, and a dicarboxylic acid constituent unit thereof is derived from an α, ω linear aliphatic dicarboxylic acid having from 4 to 20 carbon atoms, wherein in the case where when held at 23 degrees Celsius as those described in U.S. Patent Application Publication No. 201510218315 A1, entitled MOISTURE-ABSORBING/RELEASING MATERIAL, published on 6 Aug. 2015. In some preferred embodiments, the moisture controlling material is a humidity regulating salt solution. Suitable humidity regulating salt solutions are described in, for example, European Patent No. 0 348 840 B1, entitled Humidistat, published on 13 Mar. 1996. Other suitable moisture control materials include those listed in O'Brien, *J. Sci. Instruments*, pp. 73-76 (March 1948).

Table 1 below illustrates examples of suitable humidity regulating salt solutions that can be employed, which are examples presented in European Patent No. 0 348 840 B1.

TABLE 1

Examples of humidity regulating salt solutions

| Salt | Percent Relative Humidity | Temperature (° C.) | Concentration (g/ml of $H_2O$) |
|---|---|---|---|
| Potassium Carbonate ($K_2CO_3 \cdot 2H_2O$) | 43 | 24.5 | 1.47 @ 20° C. |
| Magnesium Acetate ($Mg(C_2H_3O_2)_2 \cdot 4H_2O$) | 65 | 20 | 1.20 @ 20° C. |
| Sodium Acetate ($NaCH_3O_2 \cdot 3H_2O$) | 76 | 20 | 1.19 @ 20° C. |
| Ammonium Chloride $NH_4Cl$ | 68.6 | 30 | 0.28 @ 0° C. |
| Ammonium Nitrate $NH_4NO_3$ | 65 | 20 | 1.18 @ 0° C. |
| Sodium Bromide $NaBr \cdot 2H_2O$ | 58 | 20 | 1.16 @ 50° C. |

In some embodiments, more than one moisture controlling material can be used to control the relative humidity inside a sealed package. For example, a solution comprising two or more humidity regulating salts can be used.

A humidity regulating salt solution can be incorporated into a packaging material of the present invention in any suitable manner. For example, a polymeric material can be charged or impregnated with the salt solution. Preferably, the salt solution is a saturated salt solution. Preferably, the polymeric material is a film or forms a layer of the packaging material. Any suitable polymeric material which can sorb the salt solution or into which the salt solution can impregnate can be used. Preferably, the polymeric material comprises intermingled discrete fibers that are capable of absorbing the salt solution. The polymeric material can be any number of absorbent materials such as fluff pulp, laminated tissue or coform absorbent. A coform sheet is preferred. A coform layer can be produced in accordance with the teachings in U.S. Pat. No. 4,100,324 to Anderson et al. The coform layer may include combinations of natural and man-made fibers. Preferably, the coform layer includes meltblown fibers. Meltblown fibers can be made from polypropylene, polyethylene, polyester, or nylon. Preferably, the meltblown fibers are made from polypropylene. Staple length fibers of the coform layer can be, for example, cellulose, cotton, flax, jute, silk, polypropylene, polyethylene, polyester, rayon, or nylon. In preferred embodiments, the coform layer is a 70/30 mixture of wood pulp (staple length) to polymer (short) fibers.

A polymeric layer comprising the moisture control material can be bonded to other layers of the packaging in any suitable manner, such as by adhesive, ultrasonic bonding, or heat bonding.

Packaging materials described herein may include one or more additional optional layers, such as an outer layer which can be an abuse-resistant outer layer, one or more intermediate layers, and one or more tie layers.

The packaging materials described herein may include an outer layer exterior to the moisture barrier layer. If the outer layer can be seen by a user or consumer, the exterior surface of the film preferably has desirable optical properties and may preferably have high gloss. The outer layer also preferably provides abrasion resistance. This exterior protective layer may or may not also be used as a heat sealable layer. In some embodiments, the outer layer serves as a heat sealable layer but does not necessarily include desirable optical properties or abrasion resistance. The material chosen for the outer layer can be selected depending on the desired properties of the outer layer. For example, the layer can be made from materials chosen to be resistant to abrasive and puncture forces and other stresses and abuse which the packaging may encounter during use. The outer layer should be easy to machine. That is, the outer layer should be easy to feed through and be manipulated by machines, for example, for conveying, packaging, printing or as part of the film or bag manufacturing process. Suitable stiffness, flexibility, flex crack resistance, modulus, tensile strength, coefficient of friction, printability, and optical properties are also frequently designed into outer layers by suitable choice of materials. This layer may also be chosen to have characteristics suitable for creating desired heat seals which may be heat resistance to burn through, for example, by impulse sealers or may be used as a heat sealing surface in certain package embodiments, for example, using overlap seals. Suitable outer layers may comprise: paper, oriented polyester, amorphous polyester, polyamide, polyolefin, cast or oriented nylon, polypropylene, or copolymers, or blends thereof.

A packaging material of the present invention can include any suitable intermediate layer. An intermediate layer is any layer between the exterior layer and the interior layer, which is a moisture permeable layer. Intermediate layers may include one or more oxygen barrier layers, tie layers or layers having functional attributes useful for the film structure or its intended uses. Intermediate layers may be used to improve, impart or otherwise modify a multitude of characteristics, such as machinability, tensile properties, flexibility, stiffness, modulus, designed delamination, easy opening features, tear properties, strength, elongation, optical, and oxygen or other gas barrier. Suitable intermediate layers may include: adhesives, adhesive polymers, paper, oriented polyester, amorphous polyester, polyamide, polyolefin, nylon, polypropylene, or copolymers, or blends thereof.

A packaging material according to the present invention can include one or more adhesive layers, also known in the art as "tie layers," which can be selected to promote the adherence of adjacent layers to one another and prevent undesirable delamination. A multifunctional layer is preferably formulated to aid in the adherence of one layer to another layer without the need of using separate adhesives by virtue of the compatibility of the materials with various layers. Alternatively, the tie layers can serve as an intermediary to different adhesives that are compatible with different layers or can serve to aid in the adherence of one layer to another layer without the need of using a separate adhesive while serving as an intermediary between a different layer and an adhesive.

In embodiments where the layers comprise compatible polymers, the layers can be coextruded or laminated by heat rather than adhered via a tie layer.

Any consumer good can be packaged within a packaging material of the present invention. Preferably, the consumer good is a consumer good for which freshness is maintained or freshness is perceived when the product is stored in an environment having a relative humidity within a desired range. Examples of such consumer good include food products, smoking articles, and tobacco-containing products. Preferably, the consumer goods are smoking articles.

The term "smoking article" includes cigarettes, cigars, cigarillos and other articles in which a smoking composition, such as a tobacco composition, is lit and combusted to produce smoke. The term "smoking article" also includes those in which the smoking composition is not combusted such as but not limited to smoking articles that heat the smoking composition directly or indirectly, without burning or combusting the smoking composition, or smoking articles that neither combust nor heat the smoking composition, but rather use air flow or a chemical reaction to deliver nicotine, flavor compound or other materials from a smokable material such as tobacco.

A smoking article, particularly a smoking article comprising tobacco, is preferably stored in an environment having a relative humidity in a range from about 50% to about 80%; more preferably from about 60% to about 70%. Packaging materials of the invention can be manufactured to produce sealed interior volumes having desired relative humidities in accordance with the teachings presented herein.

In some embodiments, an inner liner of a container for consumer goods comprises a packaging material of the present invention. It is known to package consumer goods such as, for example, elongate smoking articles in containers formed from folded laminar blanks. For example, elongate smoking articles, such as cigarettes, cigarillos and cigars, are commonly sold in hinge lid packs having a box for housing the smoking articles and a lid connected to the box about a hinge line extending across the back wall of the container.

The consumer goods within the container may be wrapped in an inner liner that can be sealed to form an inner package. The container can also include an inner frame disposed either within the inner package or between the inner package and the box of the housing. Prior to first opening, the filled container may be wrapped in an outer wrapper.

The container may take any suitable form for housing consumer goods. For example, as already mentioned, the container may be a hinge-lid container having one or more hinged lids connected to a box housing the consumer goods. In one or more embodiments, the container may be a slide and shell container having an inner slide for housing the consumer goods mounted within an outer shell. Where the container is a slide and shell container, the outer shell or the inner slide may include one or more hinge lids. The container, inner frame, inner package, and outer wrapper may be formed from any suitable materials including, but not limited to, cardboard, paperboard, plastic, metal, or combinations thereof.

Through an appropriate choice of the dimensions thereof, containers according to the invention may be designed to hold different total numbers of smoking articles, or different arrangements of smoking articles. For example, through an appropriate choice of the dimensions thereof, containers according to the invention may be designed to hold a total of between ten and thirty smoking articles.

In preferred embodiments, the lid of the housing is hingedly attached to the box and is adapted to be manipulated between an open position and a closed position. In the open position, the consumer can access the consumer goods disposed within the housing. The lid can be hingedly attached to the box along a hinge line that extends across a rear wall of the container. The term "hinge line" refers to a line about which the lid may be pivoted to open the container. A hinge line may be, for example, a fold line or a score line in the panel forming the back wall of the housing.

Disposed within the housing is an inner package in which the consumer goods are disposed. The inner package at least partially defines an interior volume for housing one or more consumer goods. In some preferred embodiments, the inner package includes a first layer and a second layer attached to the first layer. A packaging material of the present invention can be one or both of the first and second layers.

The first layer can include an inner surface and an outer surface. The first layer can also include a line of weakness formed in the first layer that defines a flap of the inner package. The line of weakness can take any suitable shape or combination of shapes. Preferably, the line of weakness defines a flap that has three sides that separate the flap from the first layer, and a fourth side that forms a hinge line between the flap and the first layer. In some embodiments, the flap can be attached to an inner surface of the lid of the box such that upon opening the lid the flap is separated from the inner package along the line of weakness.

The line of weakness can be continuous or discontinuous (for example, perforated). Further, the line of weakness can be formed using any suitable technique or combination of techniques, for example, laser cutting or mechanical cutting (for example, die cutting or kiss cutting). The line of weakness can include any suitable depth in a direction transverse to the inner and outer surfaces of the first layer.

The inner package may be securely sealed along the line of weakness before the first opening of the container. This may increase the storage life of the consumer goods contained within the container.

The second layer can include an inner surface and an outer surface. The second layer can also include an access opening through which consumer goods can be removed. The access opening is covered by the flap formed in the first layer when the flap is in the closed position. Further, the access opening is at least partially uncovered when the flap of the first layer is in the open position. In one or more embodiments, the access opening is completely uncovered when the flap is in the open position.

The access opening can be disposed in any suitable location on the second layer. In one or more embodiments, the access opening can be disposed on the second layer such that it is located on a front wall of the inner package. In one or more embodiments, the access opening can be disposed on the second layer such that it is located on a top wall of the inner package. In one or more embodiments, the access opening can be disposed on the second layer such that it is located across a portion of the front wall and the top wall of the inner package.

The access opening can take any suitable shape or combination of shapes. Further, the access opening can be formed using any suitable technique or combination of techniques, for example, laser cutting or mechanical cutting (for example, die cutting).

The second layer can be attached to the inner surface of the first layer using any suitable technique or combination of techniques. Preferably, the second layer is attached to the inner surface of the first layer using an adhesive. Any suitable adhesive or combination of adhesives can be utilized. Preferably, the adhesive is a repositionable adhesive. Any suitable repositionable adhesive can be utilized, for example, a pressure sensitive adhesive.

The second layer can have any suitable dimensions in relation to the first layer. In one or more embodiments, the second layer is coextensive with the first layer. In other words, the second layer extends to an outer perimeter of the first layer. In one or more embodiments, the second layer can have a surface area that is less than a surface area of the first layer. For example, the second layer can be an adhesive label attached to the first layer, where the second layer is not coextensive with the first layer.

At least a portion of the outer surface of the first layer can be permanently affixed to a corresponding portion of an inner surface of the rear wall of the box. Any suitable technique or combination of techniques can be utilized to affix this portion of the outer surface of the first layer to the rear wall of the box. Preferably, a permanent adhesive is utilized to attach the portion of the outer surface of the first layer to the rear wall of the box. Further, at least a portion of the outer surface of the first layer can be permanently affixed to a corresponding portion of an inner surface of the front wall of the box. Once again, any suitable technique or combination of techniques can be utilized to attach this portion of the outer surface of the first layer to the inner surface of the front wall of the box, for example, adhering the outer surface of the first layer to the inner surface of the front wall of the box with a permanent adhesive.

In one or more embodiments, the flap of the first layer defined by the line of weakness can be attached to an inner surface of the lid of the housing of the container. Any suitable technique or combination of techniques can be utilized to attach the flap to the inner surface of the lid, for example, mechanical fasteners, adhesives, thermal or ultrasonic bonds, and combinations thereof. Preferably, the flap is attached to the inner surface of the lid using an adhesive. The adhesive can be any suitable adhesive or combination of adhesives. Preferably, the adhesive is a permanent adhesive. Any suitable portion of the flap can be attached to the inner surface of the lid. In one or more embodiments, a portion of the outer surface of the first layer that forms the flap is attached to the inner surface of the lid. In one or more embodiments, a portion of the inner surface of the first layer that forms the flap is attached to the lid.

The flap is adapted to reattach to the second layer when the flap is in the closed position. The same adhesive used to attach the second layer to the first layer can be disposed between the flap and the second layer to reattach the flap to the second layer when the flap is in the closed position. In one or more embodiments, an alternative or additional adhesive or adhesives can be disposed along at least a portion of the second layer along a perimeter of the access opening disposed in the second layer such that the flap can be attached to the second layer when in the closed position. This portion of the second layer along the perimeter of the access opening defines a seal region of the second layer. The flap is adapted to overlap the access opening into the seal region such that the flap attaches to the second layer within the seal region when the flap is in the closed position. The adhesive disposed between the flap and the seal region allows for repeated opening and closing of the flap so that the consumer goods disposed within the inner package can be accessed when the flap is in the open position, and so that the consumer goods remain sealed within the inner package when the flap is in the closed condition. Preferably, the adhesive disposed between the flap and the seal region provides sufficient adhesion for the flap to be reattached at least as many times as there are consumer goods within the inner package such that the consumer can open and reseal the inner package until the package is empty.

The alternative or additional adhesive can be disposed in any suitable location between the flap and the seal region. In one or more embodiments, this adhesive can be disposed on the flap. In such embodiments, the adhesive can be disposed on the inner surface of the first layer such that it covers the entire flap. In one or more embodiments, this adhesive can be disposed along at least a portion of a perimeter of the flap corresponding to the seal region when the flap is in the closed position. In one or more embodiments, the alternative or additional adhesive can be disposed on the second layer in the seal region. Further, in one or more embodiments, the alternative or additional adhesive can be disposed on the flap and the second layer.

Preferably the flap can have an area that is greater than an area of the access opening disposed in the second layer of the inner package so that the access opening is covered by the flap when the flap is in the closed position. The line of weakness that defines the flap exposes the seal region of the second layer. The seal region can have any suitable dimension or dimensions. For example, in one or more embodiments, the seal region can have a constant width that extends from a perimeter of the access opening to the line of weakness. In one or more embodiments, the seal region can have a width that varies along the perimeter of the access opening.

The container can also include an inner frame disposed within the box. The inner frame can be disposed between the inner package and the front wall of the box or within the inner package. When disposed within the inner package, the inner frame is positioned such that a front wall of the inner package is between the inner frame and the front wall of the box. The inner frame includes a front wall and a pair of opposed sidewalls. Preferably, the inner frame is U-shaped. The term "U-shaped" is used herein to refer to a shape that includes three parts, wherein the first part and the third part are parallel to each other and extend in the same direction perpendicular to the second part.

Preferably, the front wall of the inner frame is disposed such that the front wall of the inner package is between the front wall of the inner frame and the front wall of the box. Advantageously, an inner frame with a large surface area provided adjacent the front wall of the inner package increases the structural strength of the container. The increased structural strength provided by the inner frame allows the more secure closing of the flap. This is particularly advantageous for subsequent closing operations when the container is no longer full.

Preferably, the inner frame includes a cut-out at the top of the front wall. The cut-out preferably substantially corresponds to the access opening, and is provided such that the consumer goods within the inner package may be more easily accessed. Where the inner frame includes a cut-out, the height of the inner frame is defined as the distance from the bottom of the inner frame to the cut-out.

The inner frame may include one or more reinforcing elements. Preferably, the one or more reinforcing elements include an adhesive such that the adhesive reinforces the inner frame and inner package. In one or more embodiments, the one or more reinforcing elements may include at least one layer of material, such as a similar cardboard to that utilized for manufacturing the inner frame, affixed to the inner frame. In such embodiment, the at least one further layer of material is permanently affixed to the inner frame. Preferably, the at least one further layer is elongate. Where the inner frame is U-shaped, the at least one further layer of material is preferably affixed to the outer surface of the front wall of the inner frame. Preferably, the at least one layer is affixed adjacent the top of the inner frame.

A carton that includes a lid and at least one sidewall can contain multiple containers as described herein.

The terms "front," "back," "upper," "lower," "side," "top," "bottom," and other terms used to describe relative positions of the components of containers refer to the container in an upright position with the lid at the top end and the consumer goods accessible from the upper end at the front. The terms "left" and "right" can be used with reference to side walls of the container when the container is viewed from the front in its upright position.

The drawings are now referred to, in which some aspects of the present invention are illustrated.

Figure 1:
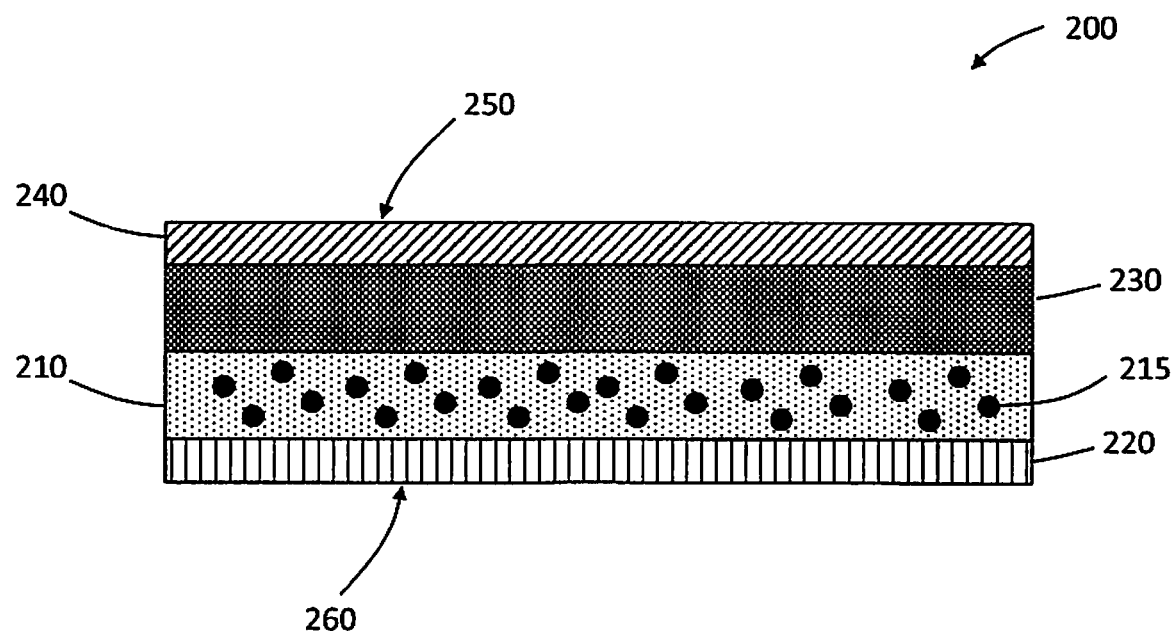
FIG. 1 is a schematic sectional view of a packaging material in accordance with various embodiments of the present invention.

Referring to FIG. 1, a flexible packaging material 200 in accordance with the present invention can include an inner surface 260 defined by a moisture permeable layer 220; an outer surface 250 defined by an outer layer 240, which can be a sealing layer; a moisture barrier layer 230; and a moisture control layer 210. The moisture control layer 210 is between the moisture barrier layer 230 and the moisture permeable layer 220. Preferably, the moisture control layer 210 is in contact with the moisture permeable layer 220. The moisture control layer 210 comprises moisture controlling material 215. In some embodiments, the moisture controlling material 215 is a polymeric material that forms the moisture control layer 210. In some embodiments, the moisture controlling material 215 is incorporated or impregnated into a base polymeric material, which together form the moisture control layer 210.

Figure 2:
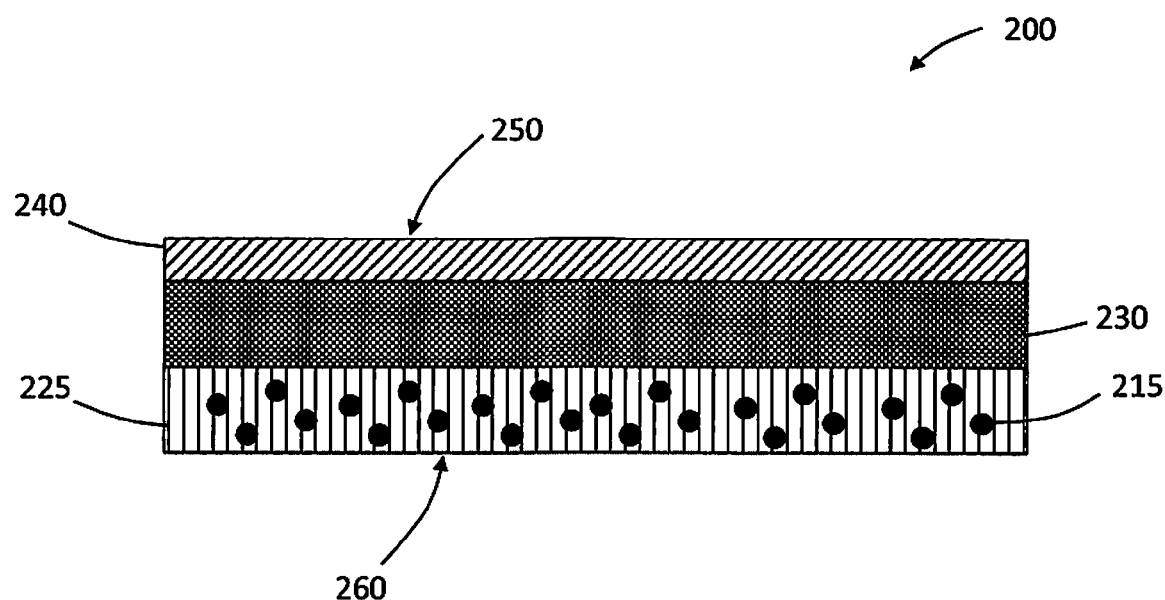
FIG. 2 is a schematic sectional view of a packaging material in accordance with various embodiments of the present invention.

Referring to FIG. 2, a flexible packaging material 200 in accordance with the present invention can include an inner surface 260 defined by a moisture control moisture permeable layer 225; an outer surface 250 defined by an outer layer 240, which can be a sealing layer; and a moisture barrier layer 230. In the depicted embodiment, the moisture control moisture permeable layer 225 is both moisture permeably and comprises moisture controlling material 215. In some embodiments, the moisture controlling material 215 is a polymeric material that forms the moisture control moisture permeable layer 225. In some embodiments, the moisture controlling material 215 is incorporated or impregnated into a base polymeric material, which together form the moisture control moisture permeable layer 225. In embodiments as depicted in FIG. 2, the moisture controlling material 215 is preferably a polyether polyamide or a humidity regulating salt solution.

FIGS. 3-8 illustrate select embodiments of containers for consumer goods, packages and liners that can employ a packaging material of the present invention. However, it will be appreciated that packaging of the present invention can be used in connection with any suitable container.

Figure 3:
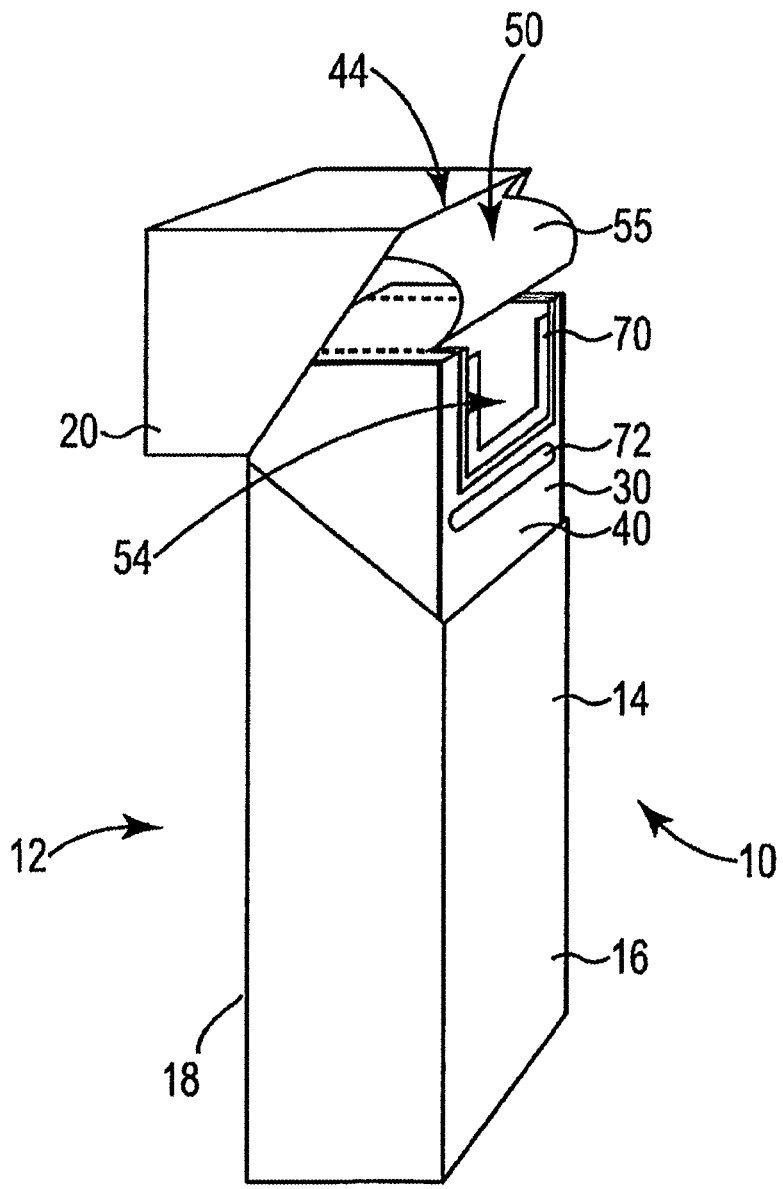
FIG. 3 is a schematic perspective view of a container in an open position, where the container includes a housing and an inner package disposed within the housing.

Referring to FIG. 3, a schematic perspective view of an embodiment of a container 10 for consumer goods is depicted. The container 10 includes a housing 12 that includes a box 14 and a lid 20 hingedly attached to the box via a hinge line (not shown). The hinge line extends across a back 18 of the box 14 of the container 10, and acts to allow the lid 20 to be moved from a closed position (FIG. 5) to an open position as shown in FIG. 3. An inner package 30 is disposed within the housing 12. The inner package 30 at least partially defines an interior volume for housing consumer goods. The inner package 30 is made from a barrier material or materials to hermetically seal the consumer goods before the container is opened for the first time. The barrier material may be a metal foil or a plastic and metal laminate.

Figure 4:
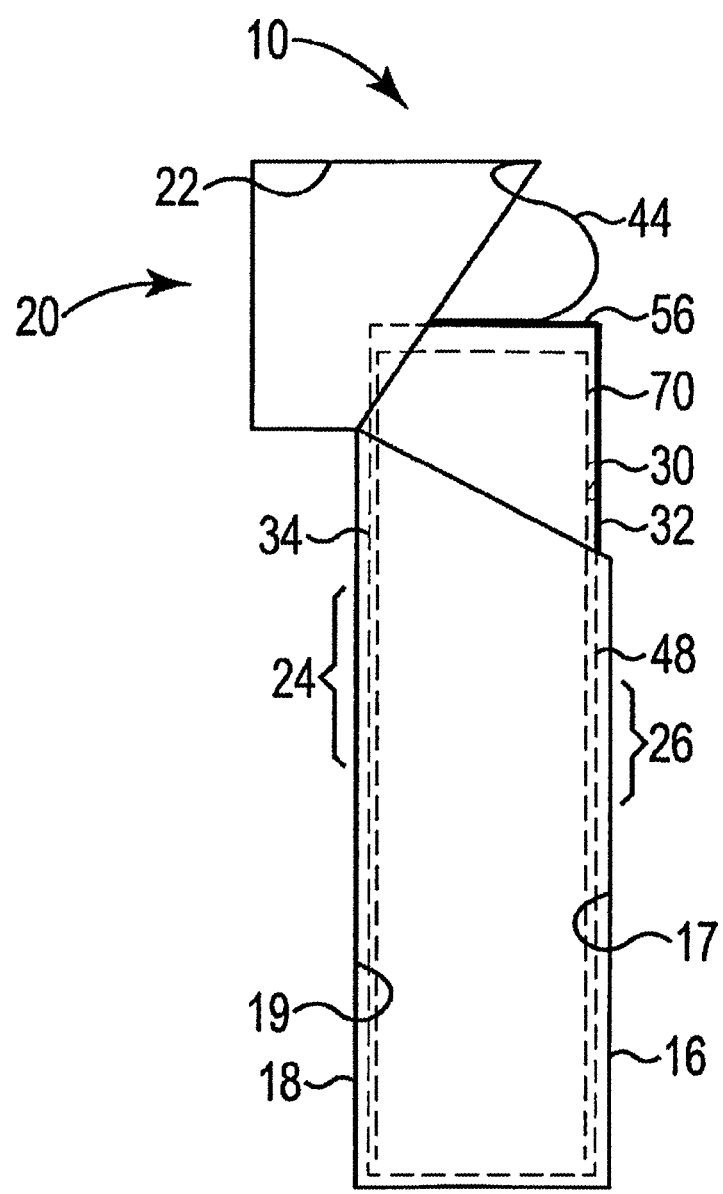
FIG. 4 is a schematic cross-section view of the container of FIG. 3.
Figure 5:
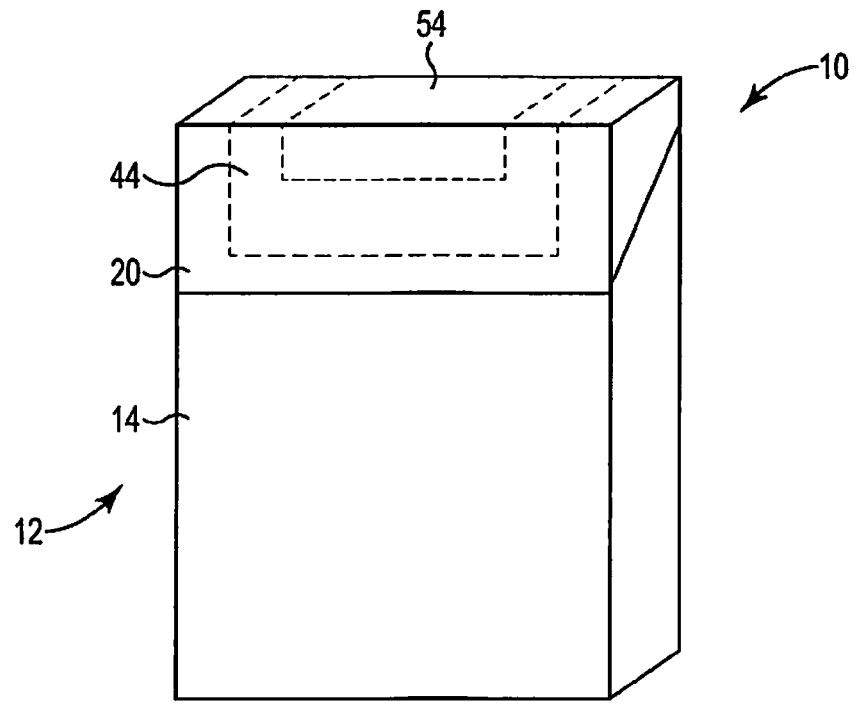
FIG. 5 is a schematic perspective view of the container of FIG. 3 in a closed position.
Figure 6:
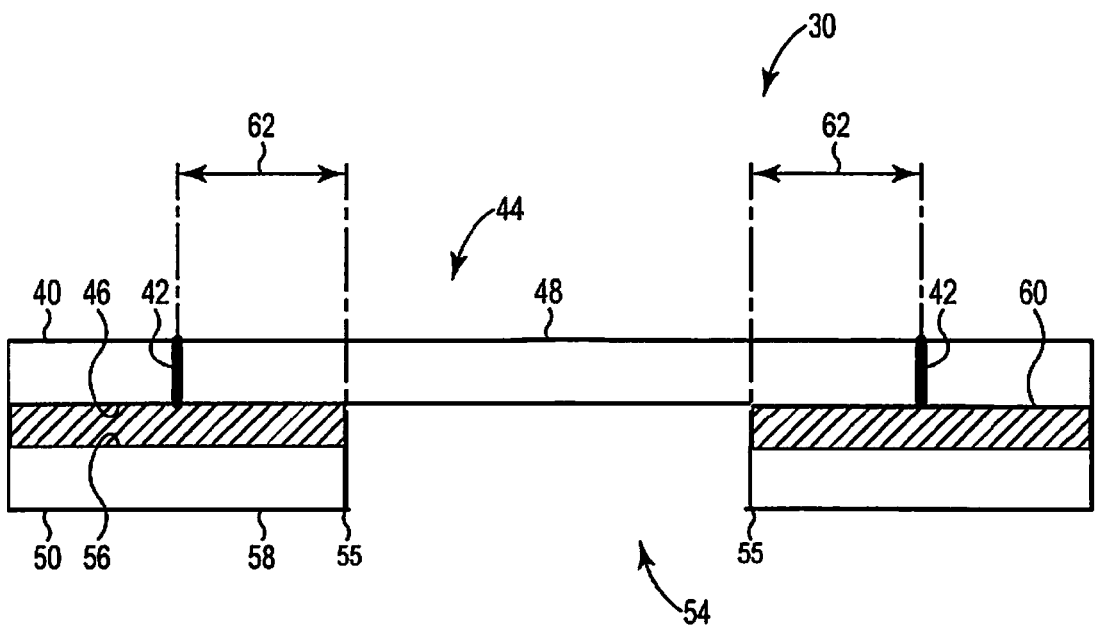
FIG. 6 is a schematic cross-section view of a portion of the inner package of FIG. 3.

The inner package 30 includes a front wall 32 and a back wall 34 (FIG. 4). The inner package 30 also includes a first layer 40 and a second layer 50 attached to an inner surface 46 of the first layer 40 (FIG. 6). The first layer 40 includes a line of weakness 42 that defines a flap 44. Further, the second layer 50 includes an access opening 54 through which the consumer goods (not shown) can be removed. The access opening 54 is covered by the flap 44 when the flap is in the closed position (FIG. 5). Further, the access opening 54 is at least partially uncovered when the flap 44 is in the open position. The flap 44 is attached to the first layer 40 along a hinge line. In one or more embodiments, the flap 44 is also attached to an inner surface 22 (FIG. 4) of the lid 20 such that upon opening the lid the flap is separated from the inner package 30 along the line of weakness 42 to at least partially uncover the access opening 54.

The container 10 also includes an inner frame 70 disposed within the inner package 30. The inner frame 70 can include a reinforcing element 72 disposed between the inner frame and an inner surface of the inner package 30.

Referring to FIG. 4, a schematic cross-section view of the container 10 of FIG. 3 is depicted with the lid 20 and the flap 44 in the open position. The inner package 30 is shown disposed within the box 14 of housing 12, and the inner frame 70 is disposed within the inner package. The flap 44 is attached to the lid 20. In the open position, the flap 44 forms an S-shape. The geometry of the container 10 is such that the flap 44 is automatically resealed to the inner package 30 when the flap (and the lid 20) is returned to the closed position.

At least a portion of an outer surface 48 of the first layer 40 of the inner package 30 is permanently affixed to a corresponding portion of an inner surface 19 of the rear wall 18 of the box 14, thereby affixing the inner package to the inner surface of the rear wall the box in a first region 24. Further, at least a portion of the outer surface 48 of the first layer 40 of the inner package 30 is permanently affixed to a corresponding portion of an inner surface 17 of the front wall 16 of the box 14, thereby affixing the inner package to the inner surface of the front wall of the box in a second region 26. By permanently affixing at least a portion of the inner package 30 to one or both of the front wall 16 and the rear wall 18 of the box 14, the structural resilience of the inner package may be further improved. The inner package 30 may be permanently affixed using, for example, hot melt adhesive, solvent based adhesive, water based adhesive, solvent-free adhesive, pressure-sensitive adhesive, conductive type sealing, and inductive type sealing. In a preferred embodiment, the inner package 30 is permanently attached to the box 14 using a hot melt adhesive.

Referring to FIG. 5, a schematic perspective view of the container 10 of FIG. 3 is depicted. The lid 20 of the container 10 and the flap 44 of the inner package 30 are in the closed position. The flap 44 is attached to the second layer 50 (FIG. 6) when the flap is in the closed position.

Referring to FIG. 6, a schematic cross-section view of a portion of the inner package 30 of FIG. 3 is depicted. The first layer 40 includes the line of weakness 42 that defines the flap 44. The second layer 50 is attached to the inner surface 44 of the first layer 40 with adhesive 60. The second layer 50 includes the access opening 54. As shown in FIG. 6, the access opening 54 is covered by the flap 44 when the flap is in the closed position. The flap 44 is adapted to be attached to the second layer 50 when the flap is in the closed position.

A seal region 62 is formed between the line of weakness 42 and a perimeter 55 of the access opening 54. The flap 44 is adapted to overlap the access opening 54 into the seal region 62 such that the flap attaches to the second layer 50 within the seal region when the flap is in the closed position. In one or more embodiments, the seal region 62 has a constant width along a perimeter of the access opening 54. In one or more embodiments, the seal region 62 has a width that varies along a perimeter of the access opening 54.

Figures 7, 8:
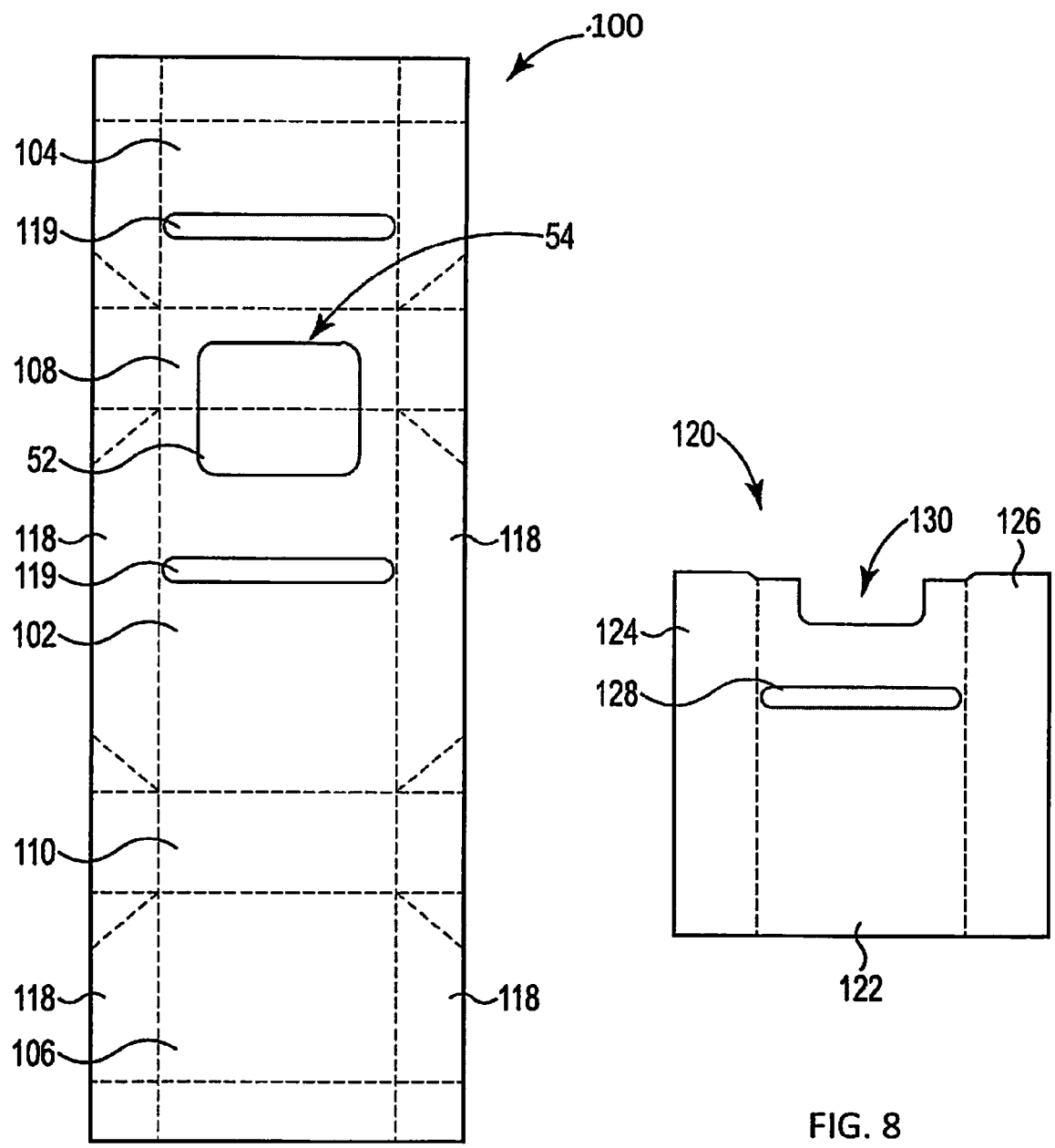
FIG. 7 is a schematic plan view of a blank used to form an inner package.
FIG. 8 is a schematic plan view of an inner frame.

Referring to FIGS. 7 and 8, schematic plan views of a pre-assembled inner package 100 and an inner frame 120 are depicted. The pre-assembled inner package 100 shown in FIG. 7 includes a front wall panel 102 that forms a front wall (for example, front wall 32 of inner package 30 of FIG. 4) of the inner package when assembled, two wall panels 104 and 106 that form a back wall (for example, back wall 34 of inner package 30 of FIG. 4) of the inner package when assembled, a top wall panel 108, and a bottom wall panel 110. The pre-assembled inner package 100 also includes a plurality of side wall panels 118. As can be seen in FIG. 7, the access opening 54 is disposed across a portion of the top wall panel 108 and the front wall panel 102. The preassembled inner package 100 can also include reinforcing elements 119. The reinforcing elements 119 can include any suitable reinforcing element described herein regarding the inner frame 70 of FIGS. 3-4.

FIG. 8 shows the pre-assembled inner frame 120. As described herein, the inner frame 120 includes a front wall 122 and two opposed side walls 124 and 126. The outer surface of the front wall 122 is provided with a reinforcing element 128. As described herein, a cut-out 130 is provided at the top of the front wall panel of the inner frame. The cut-out 130 is provided to allow the consumer goods housed within the container to be accessed more easily. The cut-out 130 is provided such that it aligns with the access opening 54 (FIG. 3) provided in the inner package 30.

The dashed lines in the above described figures indicate fold lines.

All scientific and technical terms used herein have meanings commonly used in the art unless otherwise specified. The definitions provided herein are to facilitate understanding of certain terms used frequently herein.

As used herein, the singular forms "a", "an", and "the" encompass embodiments having plural referents, unless the content clearly dictates otherwise.

As used herein, "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Thus, packaging materials, packages, containers, and assemblies for MOISTURE CONTROL PACKAGING MATERIALS are described. Various modifications and variations of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in packaging manufacturing and cigarette manufacturing; or related fields are intended to be within the scope of the following claims.

The invention claimed is:

1. An inner package for smoking articles comprising:
   a flexible multilayer packaging material comprising:
   a moisture barrier layer; and
   a moisture control layer comprising a moisture controlling material comprising a humidity regulating salt solution, wherein the moisture controlling material is a material that can sorb or desorb moisture, and
   wherein the moisture control layer defines all or substantially all of a sealed inner surface of the inner package, wherein the moisture control layer has a water vapor transmission rate of greater than 20 g/m$^2$ per 24 h at 38° C. and 90% relative humidity.

2. The inner package of claim 1, wherein the moisture control layer is moisture permeable.

3. The inner package of claim 2, wherein the moisture control layer is a heat sealable layer.

4. The inner package of claim 1, wherein the moisture barrier layer and the moisture control layer are sealable layers.

5. The inner package of claim 1, wherein an additional heat-sealable layer is positioned on the moisture barrier layer as an outer layer.

6. The inner package of claim 1, wherein an additional heat-sealable layer is positioned on the moisture controlling layer as an inner layer, wherein the additional heat-sealable layer is moisture permeable.

7. The inner package of claim 6, wherein the additional heat-sealable layer is free of the moisture controlling material.

8. The inner package of claim 1, wherein the moisture barrier layer has a water vapor transmission rate of less than or equal to 20 g/m$^2$ per 24 h at 38° C. and 90% relative humidity.

9. The inner package of claim 1, wherein the moisture controlling material is configured to maintain a relative humidity between 20% and 90% in a interior volume defined by the packaging material when sealed.

10. The inner package of claim 1, wherein the humidity regulating salt solution is selected from the group consisting of potassium carbonate solution, magnesium acetate solution, sodium acetate solution, ammonium chloride solution, ammonium nitrate solution, and sodium bromide solution.

11. The inner package of claim 1, wherein the humidity regulating salt solution is impregnated in a polymer carrier.

12. The inner package of claim 1, wherein the moisture controlling material comprises a polyether polyamide.

13. A container, comprising:
    a housing comprising a box and a lid hingedly attached to the box; and
    the inner package of claim 1 disposed within the housing and defining an interior volume for housing one or more consumer goods,
    wherein the inner package defines an access opening through which the one or more consumer goods can be removed.

14. The container of claim 13, wherein the inner package comprises a resealable flap, wherein the access opening is covered by the flap when the flap in a closed position, and wherein the access opening is at least partially uncovered when the flap is in an open position.

15. The container of claim 13, wherein a flap is attached to an inner surface of the lid of the box such that upon opening the lid the flap is separated from the inner package along a line of weakness.

* * * * *